(No Model.)
J. A. DUNNING.
HORSESHOE.
No. 363,996. Patented May 31, 1887.
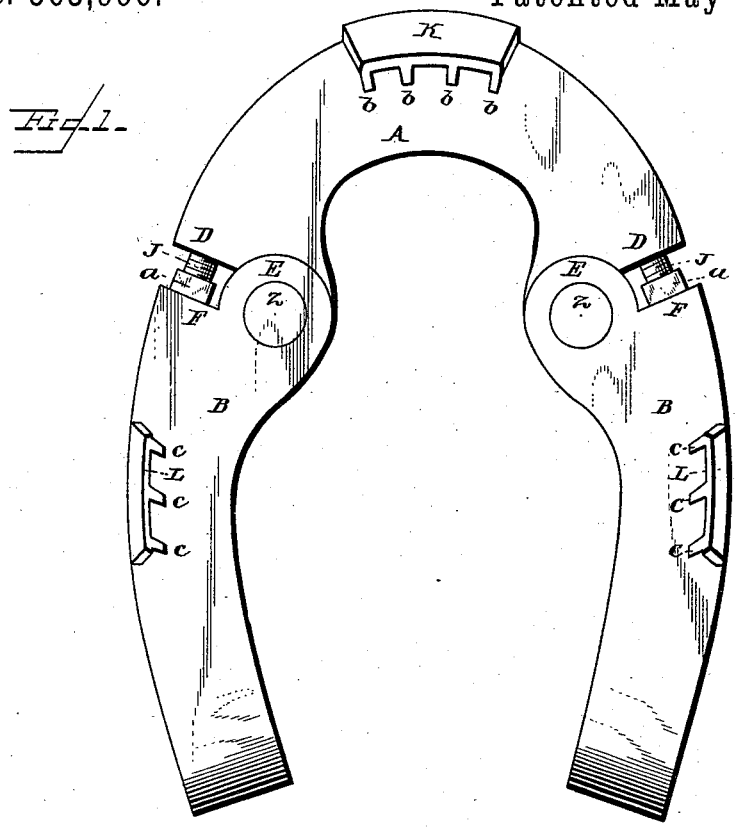
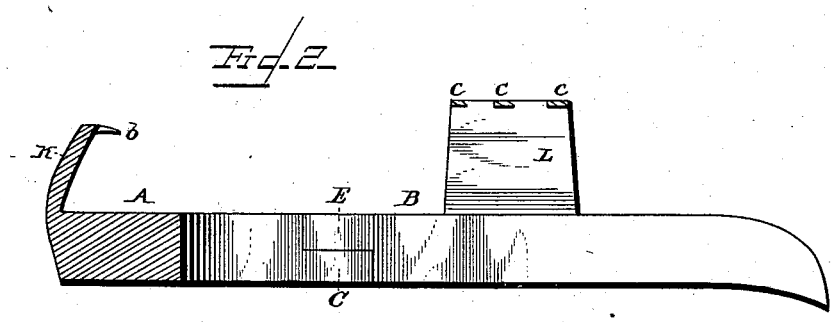
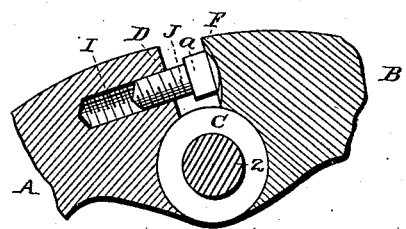
WITNESSES
B. Fugitt,
Phil C. Masi.
INVENTOR
J. A. Dunning,
by Anderson & Smith
Attorneys
N. PETERS, Photo-Lithographer, Washington, D. C.

UNITED STATES PATENT OFFICE.

JAMES A. DUNNING, OF AULANDER, NORTH CAROLINA.

HORSESHOE.

SPECIFICATION forming part of Letters Patent No. 363,996, dated May 31, 1887.

Application filed January 29, 1887. Serial No. 225,912. (No model.)

*To all whom it may concern:*

Be it known that I, JAMES A. DUNNING, a citizen of the United States, and a resident of Aulander, in the county of Bertie and State of North Carolina, have invented certain new and useful Improvements in Horseshoes; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation my invention, and is a top view of the same. Fig. 2 is a vertical longitudinal section; and Fig. 3 is a detail sectional view.

This invention has relation to jointed horseshoes adapted to be adjusted to the hoof; and it consists in the construction and novel combination of parts, as hereinafter described and claimed.

In the accompanying drawings, the letter A designates the front or arched section, and B B the side pieces of the shoe. The front section is formed at each end with a joint-lug, C, which extends rearward, and exteriorly arranged with reference to said joint-lug is a shoulder, D, of said section. Each side piece or section B is also formed with a joint-lug, as at E, which is adapted to be connected to the joint-lug C by a suitable pin or rivet, $z$, and also has an exterior shoulder, as indicated at F, this shoulder being where the sections are connected in rear of the shoulder D of the front section. Formed in the shoulder portion of the section is a threaded aperture or socket, I, in which is placed a screw, J, said screw having a key-seat, as at $a$, whereby it can be turned.

From the upper forward portion of the section A extends upward and somewhat backward the inclined front lug, K, the upper portion of which is provided with the rearwardly-extending teeth $b$. Each side piece or section B is also provided with a lug, L, extending from its outer and upper portion upward and somewhat inward, said lug L having raking-teeth $c$ extending inward and a little backward obliquely.

This shoe is adapted to be fitted to hoofs of different size and is readily fastened on and taken off, no nails being employed.

In applying the shoe the hoof is trimmed and the shoe put in proper position. Then the front lug, K, is driven so that its teeth enter the front of the hoof. Next the side sections are brought up close to the hoof and the lugs L are driven up so that the teeth thereof enter the hoof on the sides. As these teeth $c$ slant a little rearward, there will be no tendency to loosen the front lug, but rather to draw this fastening more closely to the hoof.

After the lugs are properly driven the locking-screws J are turned outward until they engage the stop-shoulders on each side of the shoe. In this manner the side sections are locked in position, so that they are not liable to become casually unfastened.

Having described this invention, what I claim, and desire to secure by Letters Patent, is—

A jointed horseshoe having its front section provided with a central inclined toothed fastening-lug and end shoulders, its side sections provided with toothed fastening-lugs and shoulders in rear of the end shoulders of the front section, and screws engaging threaded apertures and adapted to lock the sections in position, substantially as specified.

In testimony whereof I affix my signature in presence of two witnesses.

JAMES A. DUNNING.

Witnesses:
PHILIP C. MASI,
THEO. MUNGEN.